United States Patent
Davenport et al.

(10) Patent No.: US 8,522,350 B2
(45) Date of Patent: Aug. 27, 2013

(54) SYSTEM AND METHOD FOR RUN-TIME ATTACK PREVENTION

(75) Inventors: Andy Davenport, John's Creek, GA (US); Hunter King, Atlanta, GA (US); Jon R. Ramsey, Atlanta, GA (US)

(73) Assignee: Dell Products, LP, Round Rock, TX (US)

( * ) Notice: Subject to any disclaimer, the term of this patent is extended or adjusted under 35 U.S.C. 154(b) by 801 days.

(21) Appl. No.: 12/622,237

(22) Filed: Nov. 19, 2009

(65) Prior Publication Data

US 2010/0125913 A1    May 20, 2010

Related U.S. Application Data

(60) Provisional application No. 61/199,728, filed on Nov. 19, 2008.

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC ............ 726/24; 726/22; 726/23; 726/25; 726/13; 726/11; 726/12; 726/2; 713/167; 713/189; 709/223; 709/224; 709/225; 709/229

(58) Field of Classification Search
USPC ............................................ 726/25
See application file for complete search history.

(56) References Cited

U.S. PATENT DOCUMENTS

| | | | |
|---|---|---|---|
| 5,974,549 A * | 10/1999 | Golan | 726/23 |
| 6,934,857 B1 | 8/2005 | Bartleson et al. | |
| 6,968,996 B2 | 11/2005 | Reddy et al. | |
| 2004/0158729 A1 | 8/2004 | Szor | |
| 2006/0005247 A1 | 1/2006 | Zhang et al. | |
| 2006/0075494 A1* | 4/2006 | Bertman et al. | 726/22 |
| 2007/0136811 A1 | 6/2007 | Gruzman et al. | |
| 2008/0235764 A1* | 9/2008 | Cohen et al. | 726/2 |
| 2010/0037317 A1* | 2/2010 | Oh | 726/23 |

* cited by examiner

*Primary Examiner* — Nathan Flynn
*Assistant Examiner* — Bryan Wright
(74) *Attorney, Agent, or Firm* — Larson Newman, LLP

(57) ABSTRACT

Preventing attacks on a computer at run-time. Content that is configured to access at least one function of a computer is received by the computer. Protections corresponding to the function are added to the content, wherein the protections override the function. The content and the protections are then transmitted to the computer. The function may expose a vulnerability of the computer, and arguments passed to the function may exploit that vulnerability. The protections are executed when the content is executed, and determine whether the arguments the content passed into the function represent a threat. In response to determining that the arguments represent a threat, execution of the content is terminated without executing the function.

38 Claims, 10 Drawing Sheets

SYSTEM AND METHOD FOR RUN-TIME ATTACK PREVENTION

CROSS REFERENCE TO RELATED APPLICATIONS

This patent application claims priority under 35 U.S.C. §119 to U.S. Provisional Patent Application No. 61/199,728, entitled "Virtual Vault," filed Nov. 19, 2008. The complete disclosure of the above-identified priority application is hereby fully incorporated herein by reference.

FIELD OF THE INVENTION

This invention relates generally to the field of computer and network security, and more specifically to identifying malicious programs and code, and preventing the execution thereof.

BACKGROUND OF THE INVENTION

For decades, hackers have sought ways to install malicious programs ("malware") on computers or other networked devices. Often, malware operates to damage or otherwise hamper the functionality of the computer on which it is installed (the "host"). Malware can also provide the hacker with access to sensitive information that is present on the host computer and the network to which the host is attached. Malware can also use the host computer to distribute additional malware by hijacking the email and other network communication facilities of the host.

The conventional method of installing malicious programs is to secret them onto a host computer in an otherwise benign-appearing program or document. For example, malware can be included in an email message, and can run automatically upon opening the email message or viewing images within the message. Malware can also be associated with a program that the user of the host computer intentionally downloaded and/or installed.

Conventionally, the primary method of detecting these threats is to, identify signatures associated with various malware. Signatures are conventionally a sequence of executable characters that are identified after an attack has occurred and been reported to specially trained analysts. The analysts identify the malware and a signature associated therewith. Analysts then design software to identify the signature in executable code or in network traffic. This is the typical mode of operation for most conventional anti-virus, anti-spyware, and intrusion detection systems.

Hackers are well aware of this conventional defense, and have developed new attacks designed to use new technologies to circumvent signature-based detection. One such attack employs executable internet code, such as JavaScript. JavaScript is a programming language designed to be embedded in hypertext markup language (HTML) pages. JavaScript provides access to executable objects outside of the web browser. For example, JavaScript allows a web page to open a document stored on the host's hard drive and modify the document. JavaScript also allows for the creation of data structures in the host computer's memory. Because JavaScript is a scripting language, it is not compiled, but rather, is transmitted to the end user's web browser as text, where it is then executed.

These features provide hackers with access to exploits. For example, it may be known that, in a given operating system or web browser, creating an array of a certain size may allow a hacker to access particularly sensitive areas of a computer's memory. JavaScript allows for the creation of such an array. Creating data structures requires certain known syntax, so signature-based detection may still be possible. Because, however, programmers have wide latitude in the names given to variables and the data placed in the array, signature-based detection becomes much more difficult, if not possible, as the attack may not become apparent until the malicious code is already running on the host's computer.

To the extent that signature-based detection would be possible in this hypothetical example, however, languages such as JavaScript offer additional avenues for hackers to hide from signature-based detection schemes. Specifically, JavaScript offers run-time evaluation of strings that can then be executed. For example, assume that the function call document.write ("hack") is a known exploit. A hacker can use JavaScript's run-time evaluation features to obfuscate the exploit as follows:
  var X="ha";
  var Y="k";
  var Z="doc";
  var A="ument.wr";
  var B="ite(";
  var C=")";
  var D="c";
  eval(Z+A+B+X+D+Y+C);
The code above would evaluate the strings as document.write ("hack") and execute the malicious code. Compounding the problem is that JavaScript provides few limits as to the names of the variables or the order in which they appear. Thus, hackers are limited only by their imagination as to ways to obfuscate their malicious code. Further, because JavaScript can be automatically generated at the moment a web page is requested, obfuscation mechanisms such as that described above can be randomly created in response to a request in such a way that ensures that each attack will have a different signature from the last. Accordingly, conventional signature-based detection is difficult, if not impossible, for this new breed of internet attacks.

A further problem with such attacks is that they can be hidden in code received from otherwise trusted sources. For example, a widely-used website may sell banner space on its website to advertisers. The advertisement that appears in that space is typically loaded from the advertiser or a third-party advertisement server when an end user browses to the web page. The advertisement can also be loaded onto servers associated with the website before the end user browses to the web page, in which case the advertisement can be served to the user without connecting to an external server when the end user browses to the website. Other than contractual controls, the company running the website may have little control over the content of the advertisement. If malicious code is placed in the advertisement, the website may not know until it has already served out millions of infected pages. Accordingly, conventional methods of blocking internet traffic from untrustworthy sources or only allowing traffic from trustworthy sources may be insufficient to prevent attacks.

The conventional method of preventing such attacks is to disable the execution of internet-based executable code including, but not limited to, JavaScript, Adobe Flash, and Microsoft Silverlight. Preventing the execution of such code, however, may cause certain web pages not to function correctly, and detracts from the rich internet content that this code makes available.

Accordingly, a need exists for a system that can identify and prevent attacks delivered in executable code. A further need exists for a system that can identify and prevent such attacks even when obfuscated such that the presence of the attack cannot be detected until run time. An additional need exists for reputable web site operators to protect visitors to their sites from attacks that may be secreted into content published via their sites, such as banner advertisements controlled by third party advertisers.

SUMMARY OF THE INVENTION

The present invention can satisfy the above-identified needs by providing a system and method for run-time attack prevention. In one aspect of the invention, a method is provided whereby content can be received that is destined for a computer. The content can be configured to access at least one function that exposes a vulnerability of the computer. Protections that override the function or modify the execution of the content can then be added to the content. The content, including the protections, are then sent to the computer.

Once the computer receives the content and the protections, the computer executes the content. If the content calls the function that exposes a vulnerability of the computer, then the protection is executed. Upon executing the protection, any arguments the content attempted to pass into the function are analyzed and a determination is made as to whether those arguments represent a threat. If it is determined that the arguments represent a threat to the computer, execution of the content is terminated without executing the function. If, on the other hand, the arguments do not represent a threat, the vulnerable function is allowed to execute normally.

If it is determined that the arguments passed to the function represent a threat and execution of the content is terminated, an alert may be sent to a network administrator. An alert may also be sent to an end-user or a third-party.

When adding protections, the method may consider the computing environment associated with the computer. The computing environment may include information relating to the computer's operating system, the type and version of the web browser operating on the computer, and/or the applications installed on the computer. The method can then identify protections that correspond with the computing environment and add those protections to the content. The method can also consider the type of the content, which can include JavaScript, Flash, and Silverlight when adding protections. The method can identify protections that correspond with the type of content, and can add those protections to the content.

In another aspect of the invention, a system for preventing attacks on a computer at run time is provided. The system includes a first computer that is configured to receive content. A protection engine is coupled to the first computer, and is configured to intercept the content and add protections to the content. The protections override the function that is accessible by the content such that the protection is executed when the content calls the function. The protections can be configured to determine whether the arguments that the content passes to the function are an attack. The protections can also be configured to terminate the execution of the content upon determining that the arguments are an attack. The protections can also modify the execution of the content to thwart attacks that depend on particular characteristics of the execution of the content. The protections are also configured to transmit an alert to the end user, the network administrator, and/or another third-party upon determining that the call to the function is an attack.

In another aspect of the invention, an additional method for preventing attacks on a computer at run time is provided. In the method, a remote server receives a request for executable content from a computer. Protections are added to the content, wherein the protections override the function that is accessible by the content. The protections and the content are then transmitted to the computer.

The computer then executes the content and the protections. The protections determine whether the arguments that the content passes to the function represent a threat to the computer. In response to determining that the arguments represent a threat to the computer, the protections terminate execution of the content. The protections can also modify the execution of the content to thwart attacks that depend on particular characteristics of the execution of the content. The protections can also alert an end user, a network administrator, or a third-party of the threat.

Additional aspects, objects, features, and advantages of the invention will become apparent to those having ordinary skill in the art upon consideration of the following detailed description of exemplary embodiments. For a more complete understanding of the exemplary embodiments of the present invention and the advantages thereof, reference is now made to the following description in conjunction with the accompanying drawings described below.

DETAILED DESCRIPTION OF EXEMPLARY EMBODIMENTS

Figure 1:
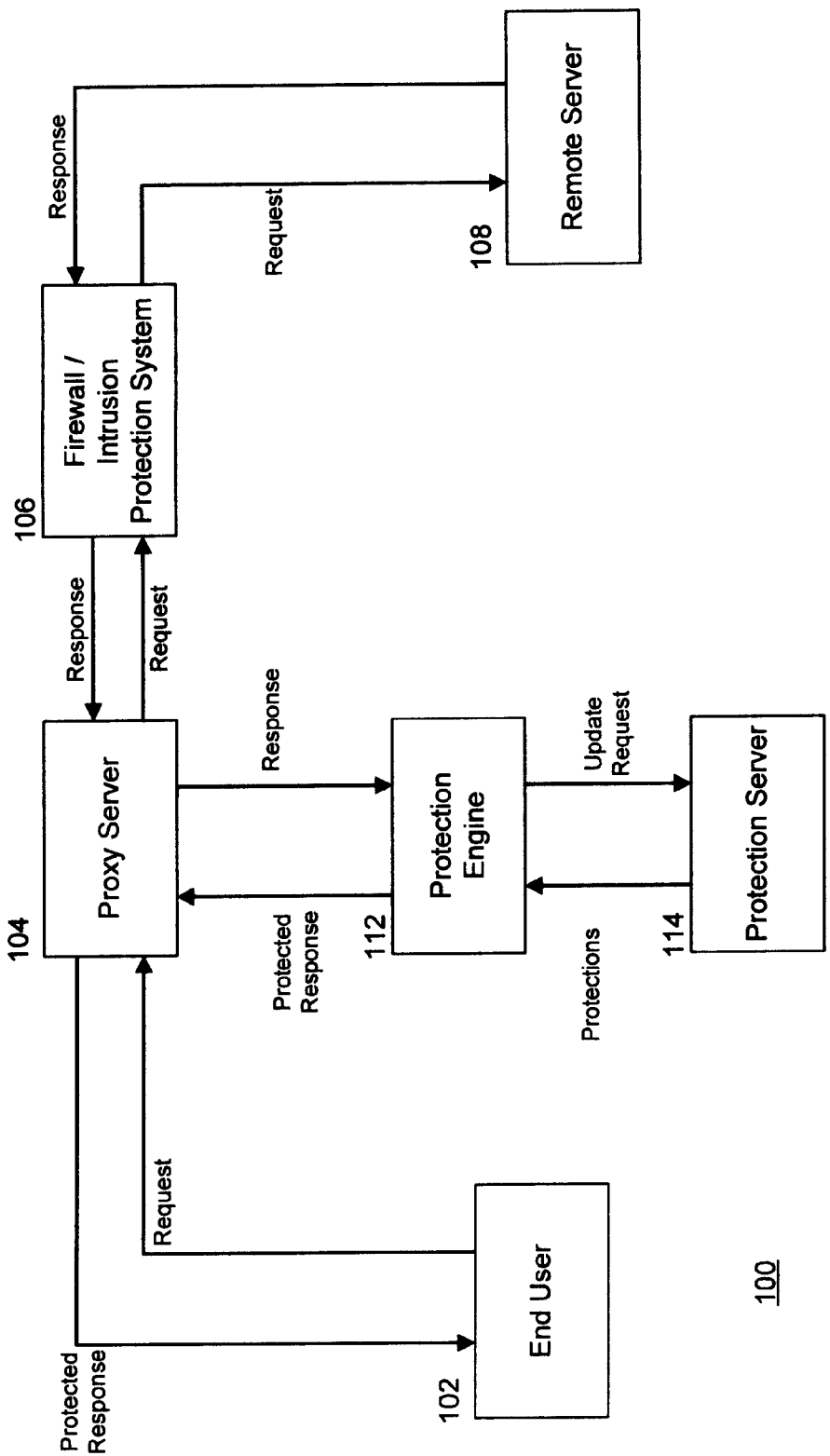
FIG. 1 is a block diagram depicting a network structure implementing a system for run-time attack prevention according to an exemplary embodiment of the present invention.

The inventive system for run-time attack prevention can intercept network traffic containing executable content destined for an end user or other agent or device that consumes content from the network. The end user's computer, also referred to as the host computer, exposes a number of functions that the content can access. Some of these functions may expose vulnerabilities associated with the computer, its operating system, or other applications installed on the computer.

Upon intercepting the content, the inventive system adds protections to the content that override (or "wrap") the functions. The protections are executed when the content attempts to call the functions that are exposed by the computer. As used herein, the term computer refers to workstations, such as personal computers, which are connected to an external network such as the internet. The term computer also refers to any network-enabled device that has a processor or controller coupled to a memory storage device, either directly or by way of a network, and is capable of receiving executable code over a network and executing that code, including, for example, laptop computers, handheld computers, mobile telephones, personal digital assistants (PDAs), portable audio players, portable video players, and global positioning systems. As used throughout this application, the term "computer" is used merely for convenience, and is intended to encompass any computer or networked device, as described above.

The protections are configured to determine, based on arguments the content attempted to pass into the function or other information (including state information such as number of times a particular function has been called), whether the content contains a threat to the computer. If the protections determine that a particular function call made by the content constitutes a threat, the protections can terminate the execution of the content. The protections can also modify the execution of the content to thwart attacks that depend on particular characteristics of the execution of the content. On the other hand, if the protections determine that particular function call is not a threat, the function can be allowed to execute normally (i.e., as called by the content). The protections can also alert the end user, the network administrator, or other third-party of the threat. Inserting protections in network-delivered executable content before the content is executed can prevent attacks directed to the exposed functions that are hidden in the content.

Before adding the protections, the inventive system can consider certain aspects of the content and the requesting computer to assist in streamlining the process. For example, if the request for content was sent by a particular version of an internet browser, the system may only add protections to the content that relate to the particular internet browser. Similarly, if the content is of a certain type of executable code (e.g., JavaScript), the system may only add those protections that are appropriate for JavaScript content.

Turning now to the drawings, in which like reference numerals refer to like elements, FIG. 1 is a block diagram depicting a network structure implementing a system 100 for run-time attack prevention according to an exemplary embodiment of the present invention. One or more end users 102 operate computers within the network.

The end user 102, via their workstation, requests content from a remote server 108 over the network. In an exemplary embodiment, the request occurs when the end user 102 opens a web browser on their computer, such as Microsoft Internet Explorer, Mozilla Firefox, Mozilla Flock, Google Chrome, Opera, or Apple Safari, and browses to a web address. The end user's 102 computer sends the request to a proxy server 104 or other device on the network, such as a router, which evaluates the request and sends the request to a firewall or intrusion protection system 106, which then passes the request to the remote server 108.

The remote server 108 receives the request and generates content in response that is sent back to the end user 102. In an exemplary embodiment, the remote server 108 is a world wide web server that stores various types of content that can be presented to the end user 102 at their computer. In this embodiment, the content consists of ASCII-formatted HTML (hyper-text markup language) code that can be rendered by the end user's 102 browser. The content may also consist of binary encoded information such as images. The images may be stored in any number of conventional image formats, such as Joint Photographic Experts Group format (JPEG or JPG), Graphics Interchange Format (GIF), Tagged Image File Format (TIFF), Portable Document Format (PDF), or other image formats that can be transmitted over a network.

The content may also consist of code that can be executed by a browser or other application capable of executing the code on the end user's 102 computer. Several standards exist for delivering executable code to browsers, including JavaScript, Adobe Flash and its associated scripting language ActionScript, and Microsoft Silverlight. JavaScript, for example, is represented by ASCII programming instructions that are executed by the browser upon receipt.

The remote server 108 directs the responsive content back to the end user 102. Before the content arrives at the end user 102, however, it must pass through the firewall/intrusion detection system 106. The firewall 106 is conventionally configured to block unwanted network traffic based on a set of easily identifiable characteristics, such as the source or destination address of the traffic. Assuming the response successfully passes through the firewall 106, it may also be examined by an intrusion detection system (IDS), which is typically configured to apply additional, more rigorous tests to network traffic in an effort to identify (and prevent) threats. For example, an IDS may store information and signatures relating to the content of network traffic to identify traffic matching patterns associated with known attacks.

Assuming the response successfully passes through the IDS, the response is then transmitted to the proxy server 104. In a conventional network, the proxy server 104 stores information relating to the end user 102 sending the request that resulted in the response, and routes the response to the appropriate end user's 102 computer. In an exemplary embodiment of the present invention, however, the protection engine 112 intervenes in this process and adds an additional layer of protection for the end user 102.

In an exemplary embodiment, the protection engine 112 operates on the same server that operates the proxy server 104. In an alternative exemplary embodiment, however, the protection engine 112 may be an entirely separate server configured to receive content from the proxy server 104 before the proxy server 104 routes the content back to the end user 102. In yet another exemplary embodiment, the protection engine 112 may be disposed at any location within the network data path. For example, the protection engine 112 may be disposed prior to the firewall/IDS 106, between the firewall/IDS 106 and the proxy server 104, or between the proxy server 104 and the end user 102. The ultimate deployment of the protection engine 112 need not be in any particular location, and may depend on a number of factors pertinent to the topology of a particular network.

Referring again to the exemplary embodiment wherein the protection engine 112 is associated with the proxy server 104, as the response passes to the proxy server 104, the protection engine 112 intercepts the response. The protection engine 112 receives the response and determines whether the response includes the type of content that can carry an attack. In an exemplary embodiment of the present invention, the protection engine 112 is configured to recognize text or other signals within the response that are intended to notify the end-user's browser of the presence of a particular type of content. For example, if the response includes JavaScript, then the response will contain a tag such as "<script type="text/javascript">". Similarly, if the response includes flash content, then it will contain a tag such as "<object data="movie.swf" type="application/x-shockwave-flash">" The protection engine 112, upon receiving such a tag (or other similar tags associated with other types of executable content), will recognize the response as containing content that can carry an attack.

Once the protection engine 112 recognizes that the response is of the type of content that can carry an attack, the protection engine 112 prepends protections to the content. In an exemplary embodiment, protections are code that executes before the potentially malicious code, and provides a barrier against attacks hidden in the code. Exemplary protections override core functions with new functionality that is configured to observe the content's functionality and identify attacks before allowing the core function to run. The term "override" indicates that the protections replace the normal functionality of the core function as described herein. The term is intended to encompass any technique of replacing or manipulating the existing functionality of the core function, including "wrapping" the core function.

JavaScript is one example of a language for which core functions can be accessed to allow attacks, and can also be overridden to protect against attacks. By way of example only, JavaScript includes a function called document.write (<arguments>) that can potentially be used to take advantage of exploits—security weaknesses—in an internet browser. Protections can override the document.write function, giving the protections an opportunity to analyze the arguments passed into the function before executing the document.write core function. In this exemplary embodiment, the core document.write function may be overridden by assigning it to a new object or variable (for example document.write.old), when the web page is initially loaded. In this way, the original document.write function becomes document.write.old. Then, when the content calls document.write, the protection is executed, which can then execute the core function if no attack is indicated.

A pseudo code representation of a protection for document.write is set forth as follows:

```
var document.write.old = document.write;
document.write(string input) {
    if (analyze_for_attacks(input) = true) {
        alert;
        terminate javascript;
    }
    else {
        document.write.old(input);
    }
}
```

As the exemplary pseudo code above indicates, when JavaScript in the received content contains a call to document.write, instead of running the function directly, the end user's 102 browser will run the protection. The protection function analyzes the arguments that the content is attempting to pass to document.write for threats. If the arguments represent a threat, the function alerts the user to the threat, and terminates the execution of the function without ever calling the core document.write function. In this way, the attack is never executed on the end user's 102 computer. On the other hand, if the arguments do not represent a threat, the document.write.old function is called, which allows the core document.write function to execute normally.

Although the example above overrides the document.write ( ) function, protections can be added to the content that override any function, including functions associated with applications that execute separately from the end user's 102 browser. Indeed, in many instances, the ability of scripting language to launch separate applications from within the browser can lead to additional avenues for attacks, since many applications contain weaknesses that can be exploited. Accordingly, protections are not limited only to browser functions, rather, they are available for any function that can be called by executable code or script within the response. Furthermore, the ability to prepend protections is not limited to functions written in JavaScript, but can apply to any executable code that may be included in the content.

In an exemplary embodiment of the present invention, the protection engine 112 adds to the content all of the protections associated with the type of content that is contained within the response. In this way, the protection engine 112 can ensure that any potentially dangerous functions are overridden. This can be especially important because a common technique of hackers, referred to herein as "obfuscation," can make it difficult to determine which function calls are contained within a response.

One example of obfuscation involves the use of the eval function. The eval function is a useful function, which allows a string to be treated as if it were executable code upon being passed into the eval function. Because a string to be passed to the eval function can be generated at runtime, it can very difficult to identify the function that will be called until it is executed.

For example, assume that the function call document.write ("hack") is a known exploit. A hacker can use the eval function to obfuscate the exploit as follows:
    var X="ha";
    var Y="k";
    var Z="doc";
    var A="ument.wr";
    var B="ite(";
    var C=")";
    var D="c";
    eval (Z+A+B+X+D+Y+C);

The code above would evaluate the strings as document.write("hack"). It would not become apparent that document.write("hack") was going to be run until actual execution time. Using a conventional system, by this time, it would be too late to prevent the attack. Similarly, performing a "pre-evaluation" of the arguments passed to the eval function would be inefficient, and would unnecessarily slow program execution.

In this embodiment of the present invention, however, the attack can be detected without expensive (in terms of processing and network resources) pre-evaluation of the response. Specifically, the eval function is allowed to run and execute document.write ("hack"). Rather than executing the browser function, however, the protection is executed. The protection then evaluates the arguments to document.write (in this case "hack"), identifies the attack, and terminates execution before the malicious code can be run.

In an alternative exemplary embodiment, rather than terminating execution of the content before executing the malicious code, the protection can modify the content in a way that can thwart the attack while still allowing content execution to continue. By way of example only, many attacks rely on specific timing and knowledge of system execution to carry out the attack. One such attack is known as a "heap spray" attack, which allocates large blocks of memory, and places certain values in particular locations. A heap spray attack relies on the memory in the heap being allocated in a particular way to function. If, however, a protection determines that a particular function call or set of function calls represent a heap spray attack, the protection can modify the execution of the content by, for example, inserting delays allocating memory in such a way as to modify the structure of the heap. This will modify the structure on which the attack relies, and will thwart the attack. One of ordinary skill in the art would recognize that while this modification of the content may be appropriate for thwarting a heap spray attack, other modifications that would be appropriate for thwarting other similar attacks that rely on timing or memory allocation are within the scope of the invention.

In an alternative exemplary embodiment, the protection engine 112 can further analyze the request and selectively prepend protections according to certain aspects of the request. In one alternative embodiment, the protection engine 112 examines the request for information pertinent to the end user's 102 operating environment, such as the operating system, the type and version of the browser that made the request, and other applications that may be present. For example, requests often carry metadata identifying the type and version of the browser from which the request was made, the operating system of the end user's 102 computer, and may also identify other software running on the end user's 102 computer. Using this information, the protection engine 112 can tailor the protections that it prepends for the requesting system. For example, web browser developers frequently update their browsers to eliminate potential exploits. If a particular browser version is known to have remedied a particular exploit, there may be no need to prepend a protection directed to that exploit. Similarly, certain exploits may be directed to code that executes an application other than the web browser. If the protection engine 112 determines from the request that the program that is the subject of a particular exploit is not installed on the end user's 102 computer, then it may determine not to prepend protections directed to that exploit.

In another alternative exemplary embodiment of the present invention, the protection engine 112 may also consider external data before prepending protections. For example, the protection engine 112 may determine whether the remote server 108 is on a whitelist. Whitelists, conventionally, are databases of servers (identified by name, internet address, or other indicator of identity) that are known to be safe for network traffic. If the remote server 108 is on a whitelist, it may improve performance if the protections are not prepended.

In an exemplary embodiment of the present invention, the protection engine 112 prepends the protections prior to the executable code in the response, meaning that the protections will be executed by the browser before any executable code that may be executed by the browser. Most conventional content includes tags that identify the location in the content where the executable code begins. The beginning of JavaScript code, for example, is conventionally identified with a <script> tag. According to the exemplary embodiment, JavaScript protections may be prepended immediately after the <script> tag, but prior to the executable code within the tag. In an alternative exemplary embodiment, when the functions in the code to be executed can be overridden with protections that do not necessarily appear before the code in the content, then the protections may be added to the code in any appropriate location, as dictated by the particular type of content and executable code.

In addition to modifying or terminating execution of the content before the potentially malicious function call occurs, the protection can also include alerting functionality that can notify one or more interested parties as to the existence of the malicious code. In an exemplary embodiment of the present invention, the alert will send a notification to the administrator of a particular network or other designated third parties. The alert can contain information relating to the attack that can assist the network administrator in determining a proper course of action, including, by way of example only, the protection that identified the attack, the type of attack, the code in which the attack was embedded, the identity of the computer requesting the content that ultimately contained the attack, the identity of the remote server 108 that transmitted the attack, and other information that may assist the recipient of the alert in any remedial action that might occur. In an alternative exemplary embodiment, an alert may be sent to the end user 102, by way of a notification that appears on the end user's 102 computer. In another alternative embodiment, the alert may be sent to a third-party, which may use information relating to the alert in a variety of ways to provide more effective services. By way of example only, the third-party may use information regarding the identity of the remote server 108 in determining whether the address of the remote server 108 should be added to an unwanted-sender list (sometimes referred to as a blacklist or blocklist). The third party may also be the provider of protections, and if so, can use the information in the alert to improve its protections.

Once protections have been prepended to the response, the protected response is sent back to the proxy server 104. The protected response is then sent to the end user 102, where it is executed in the end user's 102 browser.

The protection engine 112 is coupled to a protection server 114. The protection server 114 is configured to provide updated protections to the protection engine 112. Security analysts are constantly on the lookout for new exploits. In certain instances, exploits are discovered by security analysts or software developers looking for flaws in the software in an effort to preempt hackers. In other instances, hackers identify and exploit the flaws. In either case, once security analysts are aware of exploits that take advantage of vulnerable functions, they can override those functions with protections as described above. In an exemplary embodiment, overriding the functions involves examining the methods hackers can use to take advantage of an exploit, and generating code to examine attributes for evidence of those methods. The wrappers also can include code that examines state information, such as the number of times a particular function has been called with particular arguments, and determine if this state information represents an attack. Updated wrappers are placed on the protection server 114, and are periodically loaded or pushed onto the protection engine 112.

Figure 7:
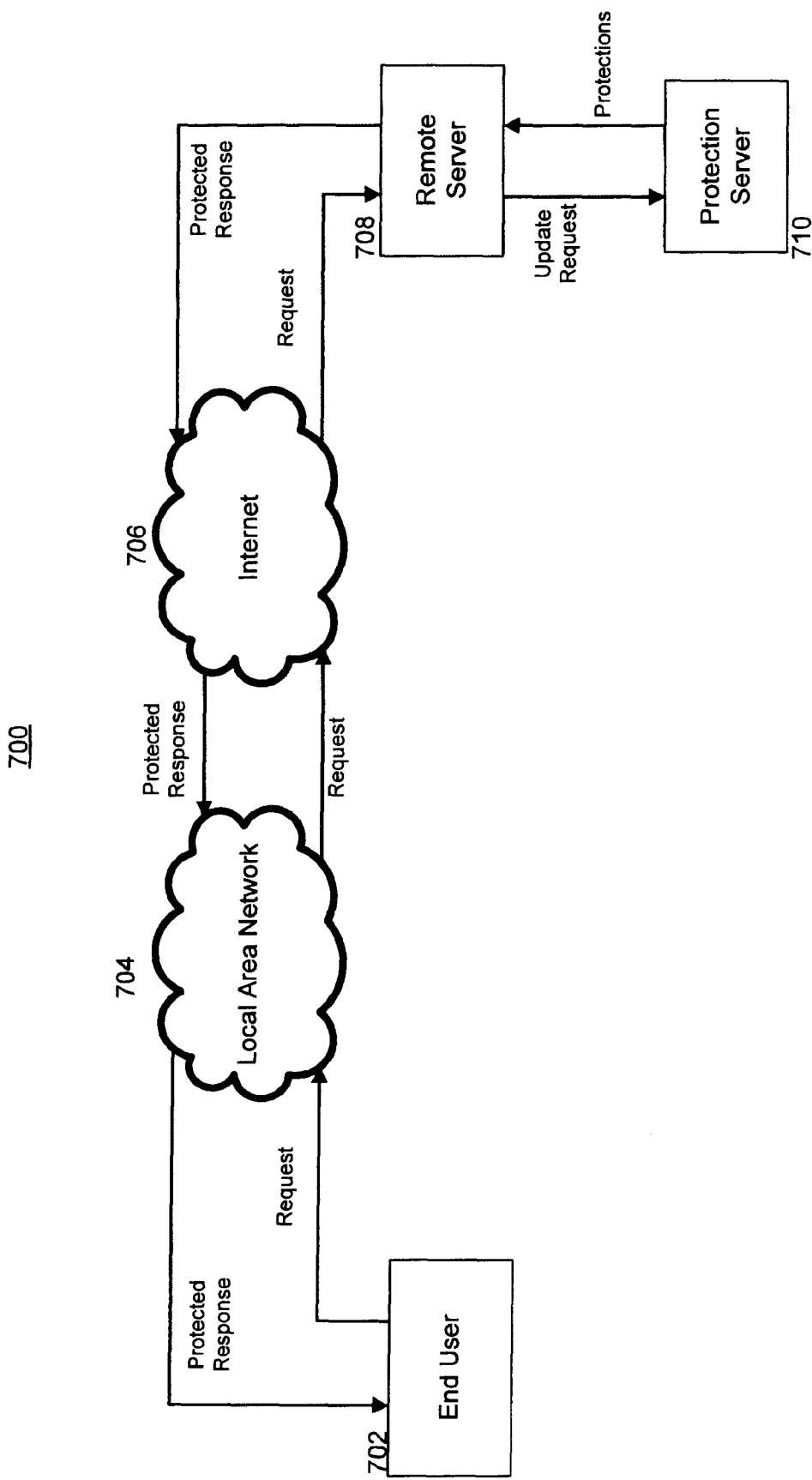
FIG. 7 is a block diagram depicting a network structure implementing a system for run-time attack prevention according to a second exemplary embodiment of the present invention.

Referring now to FIG. 7, a block diagram depicting a network structure implementing a system 700 for run-time attack prevention according to a second exemplary embodiment of the present invention is shown. Like the system of FIG. 1, the system for run-time attack prevention of FIG. 7 operates by prepending protections to responses. The system of FIG. 7 differs from the system of FIG. 1 in that, rather than prepending the protections at the network level, the protections are prepended by the remote server 108.

In an exemplary embodiment of the system 700 for run time attack prevention described in FIG. 7, an end user 702 generates a request for content. The request is sent to the local area network ("LAN") 704 to which the end user's 702 computer is attached. The request is then forwarded over the internet 706 to a remote server 708, which is designated to respond to the request. Conventionally, if the request is a request for internet/world wide web content, the response is one or more packets of text and data that make up a web page. In an exemplary embodiment of the present invention, prior to sending the response, the remote server 708 prepends protections to the response. The remote server 708 then sends the protected response back through the internet 706 and LAN 704 to the end user 702. Just as in the system of FIG. 1, the end user's 702 browser receives the protected response and executes the protections.

In this embodiment, by prepending protections to responses before sending them to the end user 702, the remote server 708 receives assurance that it is not inadvertently serving attacks on end users 702 that connect to the server. By way of example, many commercial web sites include advertisements that are served to visitors on the websites. Frequently, the commercial web site has little direct control over the content of the advertisement. Rather, the commercial website simply loads the content comprising the advertisement from another location on the internet. If that content contains malicious code, the remote server 708 may not have any indication until its end users 702 complain about attacks stemming from the web site served by the remote server 708. By prepending protections, however, the remote server 708 will have protected the end user 702 from any attacks it might inadvertently send, regardless of whether the end user 702 is associated with a system (such as the systems described in FIGS. 1 and 9) that would also provide protections.

The remote server 708 is coupled to a protection server 710. In an exemplary embodiment, the protection server 710 is similar to the protection server 114 described with respect to FIG. 1, and provides the remote server 708 with updated protections.

Figure 9:
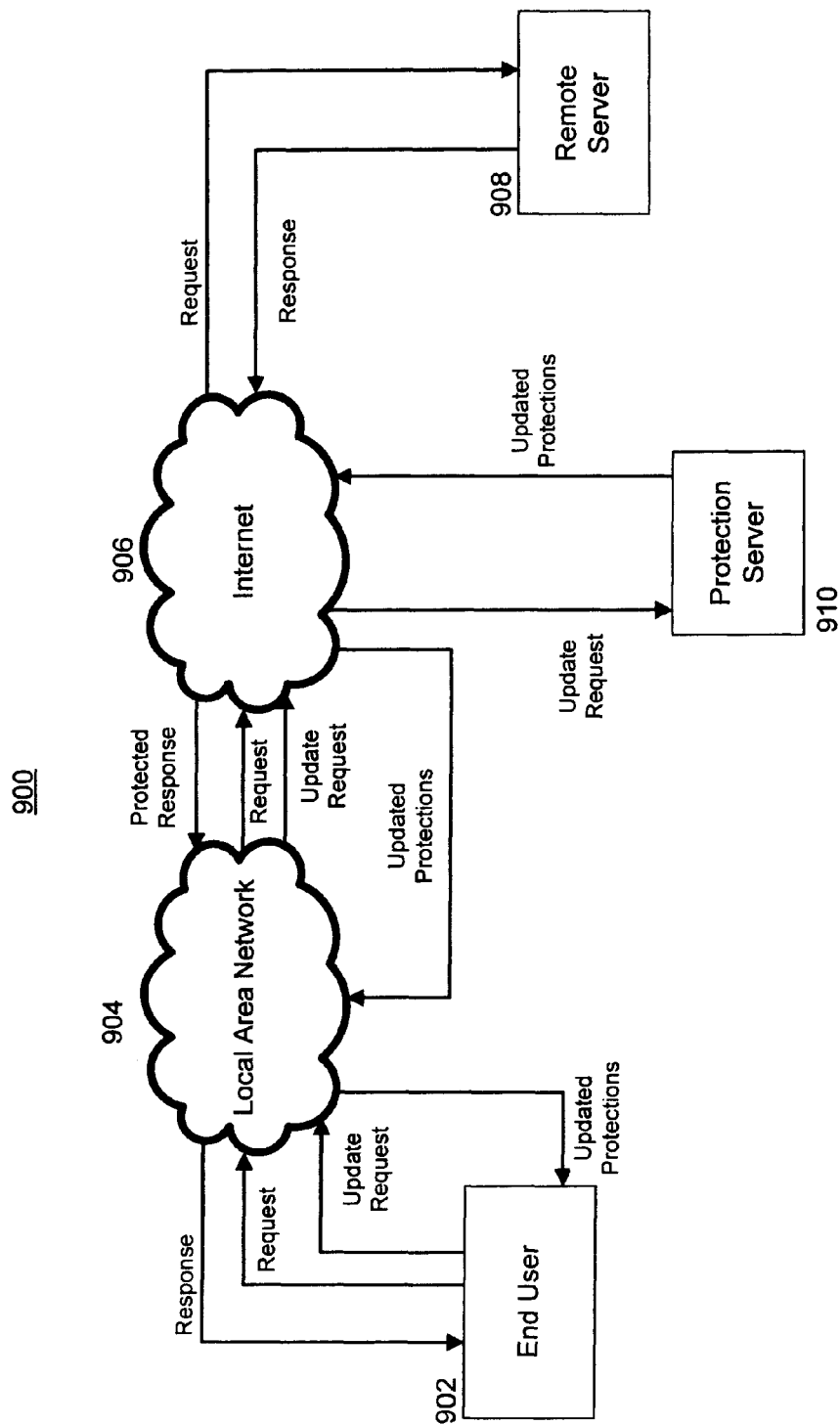
FIG. 9 is a block diagram depicting a network structure implementing a system for run-time attack prevention according to a third exemplary embodiment of the present invention.

Referring now to FIG. 9, a block diagram depicting a network structure implementing a system 900 for run-time attack prevention according to a third exemplary embodiment of the present invention is shown. Like the system of FIGS. 1 and 7, the system for run-time attack prevention of FIG. 9 operates by prepending protections to responses. The system of FIG. 9 differs from the system of FIGS. 1 and 7 in that, rather than prepending the protections at the network level, the protections are prepended by the end user's 702 computer.

In an exemplary embodiment, the end user's 902 computer sends out a request, which travels over the LAN 904 and the internet 906 to a remote server 908. The remote server 908 responds by sending the response back over the internet 906 and the LAN 904 to the end user's 902 computer. The end user's 902 computer, upon receiving the response, before passing the response to the web browser, prepends protections to the response. The protected response is then allowed to pass to the end user's 902 browser, where the protected response is executed.

The end user's 902 computer can be coupled to a protection server 910 that provides updated protections. In an exemplary embodiment, the end user's 902 computer is coupled to the protection server 910 via the internet 906, and through a LAN 904 to which the end user's 902 computer is coupled. In an alternative exemplary embodiment, the protection server 910 may be local to the end user's 902 computer, or may be located within the LAN to which the end user's 902 computer is coupled.

In an alternative exemplary embodiment of the system 900 set forth in FIG. 9, the protections may be prepended to executable code other than responses received from a remote server 908. By way of example only, the protections may themselves be executable binary code, and may be prepended to existing executable programs.

In another alternative exemplary embodiment, rather than (or in addition to) prepending protections that override functions in the executable code, protections can be prepended that modify the access that the executable code has to system level functions. In the Linux operating system, for example, certain system capabilities may only be accessed by users or processes that have been granted certain permissions. Even if a process begins execution having access to all available functionality (typically referred to as "root" or "superuser" access), a process can programmatically give up certain permissions as execution proceeds. Once a process has relinquished a permission, it cannot reclaim that permission. Accordingly, protections that modify executable code's access to the system can be prepended to the code before any malicious code contained therein can be executed, and will be prevented from reclaiming the permissions that it has, from the system's perspective, voluntarily relinquished.

For example, a process must have a particular set of permissions to be able to access memory addresses that represent input/output ports and system memory. Few, if any, legitimate processes require such access. Accordingly, a protection can be prepended to executable code that forces the process to relinquish this access, thus preemptively preventing malicious code from manipulating these resources.

Similarly, a process can also be restricted with respect to the system resources that are available to it. For example, a process can be limited to, among other things, accessing files of a certain maximum size, a certain amount of memory or processor usage, a certain number of open files, a certain amount of disk usage, and a certain number of child processes. A hallmark of some attacks, for example, a denial-of-service attack, is the spawning of multiple child processes that occupy system resources, preventing the system from responding to legitimate requests. Protections can be prepended to executable code that will limit the number of child processes (or other system resources) that a process may create or access, thus reducing the likelihood that such an attack will occur.

Figure 2:
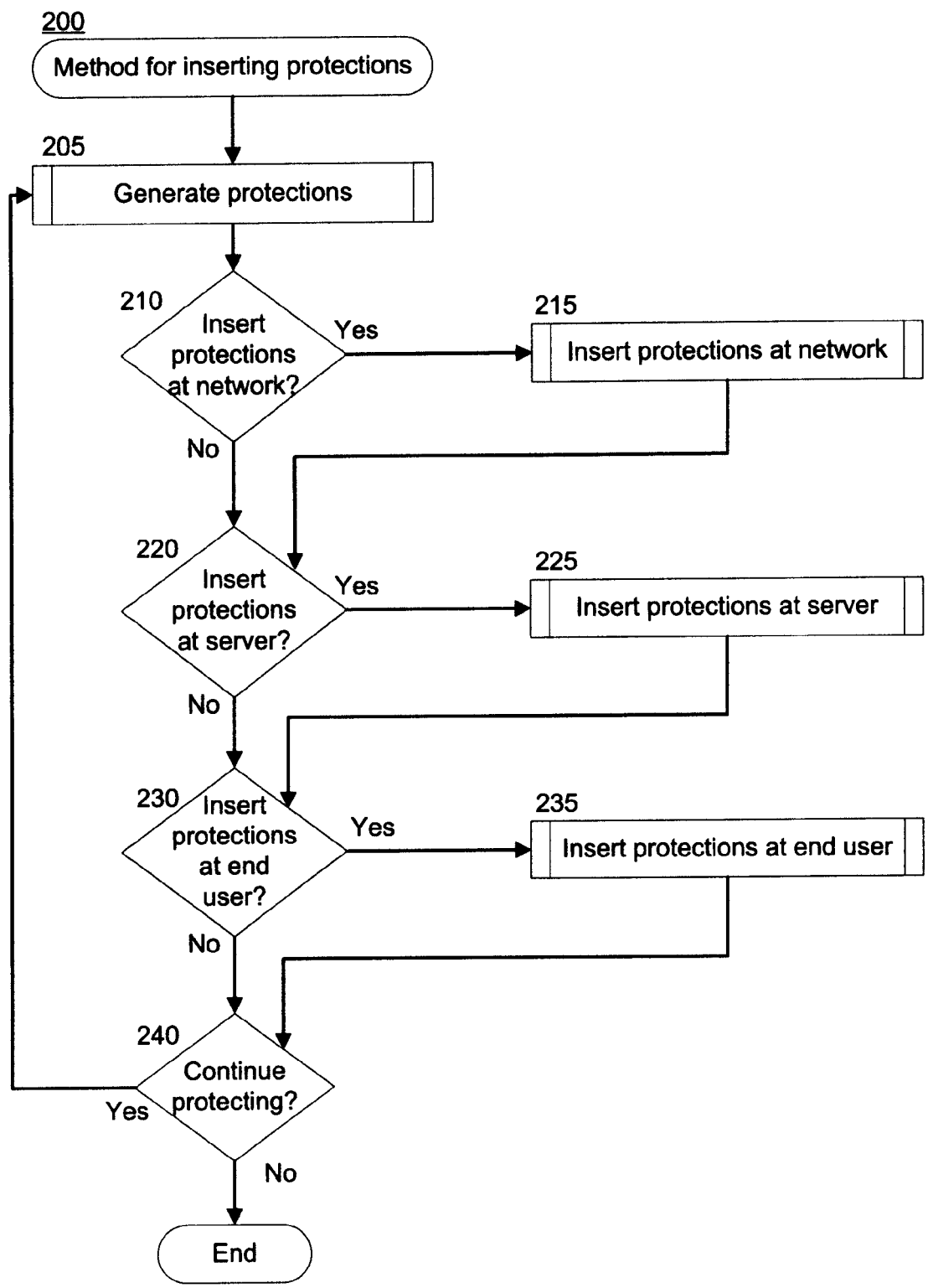
FIG. 2 is a flow chart depicting an exemplary method for using the system for run-time attack prevention of FIG. 1 to insert protections in network traffic.

Referring now to FIG. 2, which is a flow chart depicting an exemplary method 200 for inserting protections in network traffic using the systems for run-time attack prevention of FIGS. 1, 7, and 9, additional features of the present invention will be described. FIG. 2 will be discussed with respect to FIG. 1. The method highlights key functional features of the system for run-time attack prevention.

One of ordinary skill in the art will appreciate that process functions or steps performed by the system for run-time attack prevention 100 may comprise a programmed general purpose computer, electronic circuitry forming an electronic device, firmware code executing on a microcontroller or microprocessor; state machines implemented in application specific or programmable logic; or numerous other forms without departing from the spirit and scope of the invention. In other words, the invention may be provided as a computer program which may include a machine-readable medium having stored thereon instructions which may be used to program a computer (or other electronic devices) to perform a process according to the invention.

The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Certain steps in the methods described in all of the logic flow diagrams referred to below must naturally precede others for the invention to function as described. However, the invention is not limited to the order of the steps described if such order or sequence does not alter the functionality of the present invention. That is, it is recognized that some steps may be performed before, after, or in parallel other steps without departing from the scope and spirit of the present invention.

Additionally, it is recognized that certain steps could be re-arranged in different sequences or entirely deleted without deviating from the scope and spirit of the invention. In other words, it is recognized that the steps illustrated in the flow charts represent one way of achieving a desired result of protecting a network. Other ways which may include additional, different steps or the elimination of steps, or the combination of eliminating steps and adding different steps will be apparent to one of ordinary skill in the art.

Further, one of ordinary skill in programming would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Referring again to FIG. 2, step 205 is the first step of the method 200 in which protections are generated. The process of creating protections will be discussed in further detail with respect to FIG. 3. In decision step 210, it is determined whether protections are to be inserted at the network. If protections are to be inserted at the network, then the "Yes" branch is followed to step 215, wherein protections are inserted at the network. The process of inserting protections at the network will be discussed in further detail with respect to FIG. 4. The method 200 then proceeds to decision step 220. If, on the other hand, it is determined in decision step 210 that protections will not be inserted at the network, the "No" branch is followed to decision step 220.

In decision step 220, it is determined whether protections are to be inserted at the remote server 108. If protections are to be inserted at the remote server 108, then the "Yes" branch is followed to step 225, wherein protections are inserted at the remote server 108. The process of inserting protections at the remote server 108 will be discussed in further detail with respect to FIG. 8. The method 200 then proceeds to decision step 230. If, on the other hand, it is determined in decision step 220 that protections will not be inserted at the remote server 108, the "No" branch is followed to decision step 230.

In decision step 230, it is determined whether protections are to be inserted at the computer for the end user 102. If protections are to be inserted at the computer for the end user 102, the "Yes" branch is followed to step 235, wherein protections are inserted at the end user 102. The process of inserting protections at the end user 102 will be discussed in further detail with respect to FIG. 10. The method 200 then proceeds to decision step 240. If, on the other hand, it is determined in decision step 230 that protections will not be inserted at the end user 102, the "No" branch is followed to decision step 240.

In decision step 240, it is determined whether the system will continue protecting. If it is determined that the system will continue protecting, the "Yes" branch is followed to step 205. If, on the other hand, it is determined that the system will not continue protecting, the "No" branch is followed, and the method 200 ends.

Figure 3:
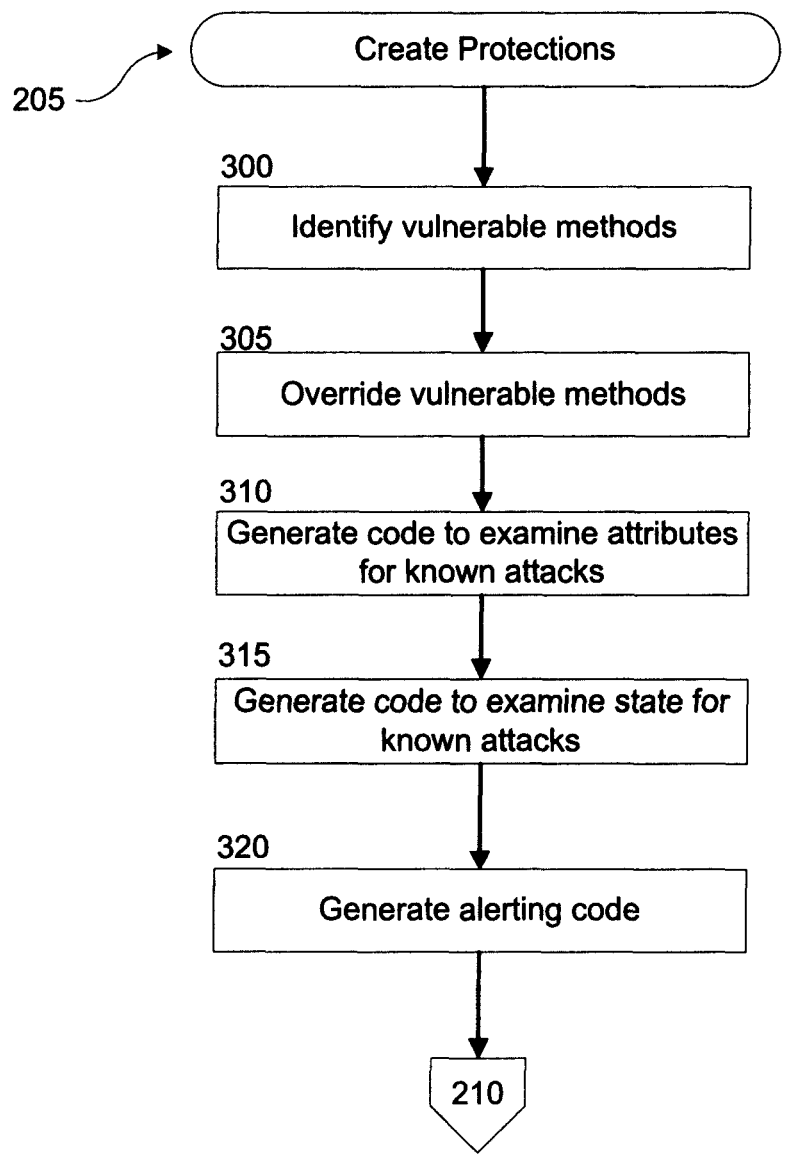
FIG. 3 is a flow chart depicting an exemplary method for creating protections using the system for run-time attack prevention of FIG. 1.

Referring now to FIG. 3, a method 205 for creating protections using the system for run-time attack prevention of FIG. 1 is described. FIG. 3 will be discussed with respect to FIGS. 1 and 2. Step 300 is the first step in the method 205, wherein vulnerable methods are identified. As discussed above, in an exemplary embodiment of the present invention, vulnerable methods can be identified by security analysts and hackers who seek out and identify vulnerabilities in software. Vulnerabilities can also be identified by reading published reports of vulnerabilities in a program, reverse engineering attacks that have already occurred, "fuzzing" or "fuzz testing" a program, which generally involves passing large amounts of random or otherwise invalid data to a program and determining whether said data results in a failure, and studying patches, fixes, or other updates a program manufacturer has distributed for a program, as these often remedy vulnerabilities in earlier versions of a program, and accordingly, can be used to identify those vulnerabilities.

The method 205 then proceeds to step 305, wherein code is written to override vulnerable methods and, if desired, to modify the execution of the content. The method 205 then proceeds to step 310 wherein code is generated to examine the attributes of the overridden vulnerable methods for known attacks. The method 205 then proceeds to step 315, wherein code is generated to examine state information to identify attacks. By way of example, code could be generated to count the number of times a NOP function is called, and to identify a potential attack if the number of NOPs exceeds a certain predetermined threshold. The method 205 then proceeds to step 320, wherein alert code is generated to alert the end user 102, the network provider, and/or other interested parties such as third parties that may be able to use information relating to the alert to remedy an existing attack and better protect against future attacks with improved protections. The method 205 then proceeds to step 210 of FIG. 2.

Figure 4:
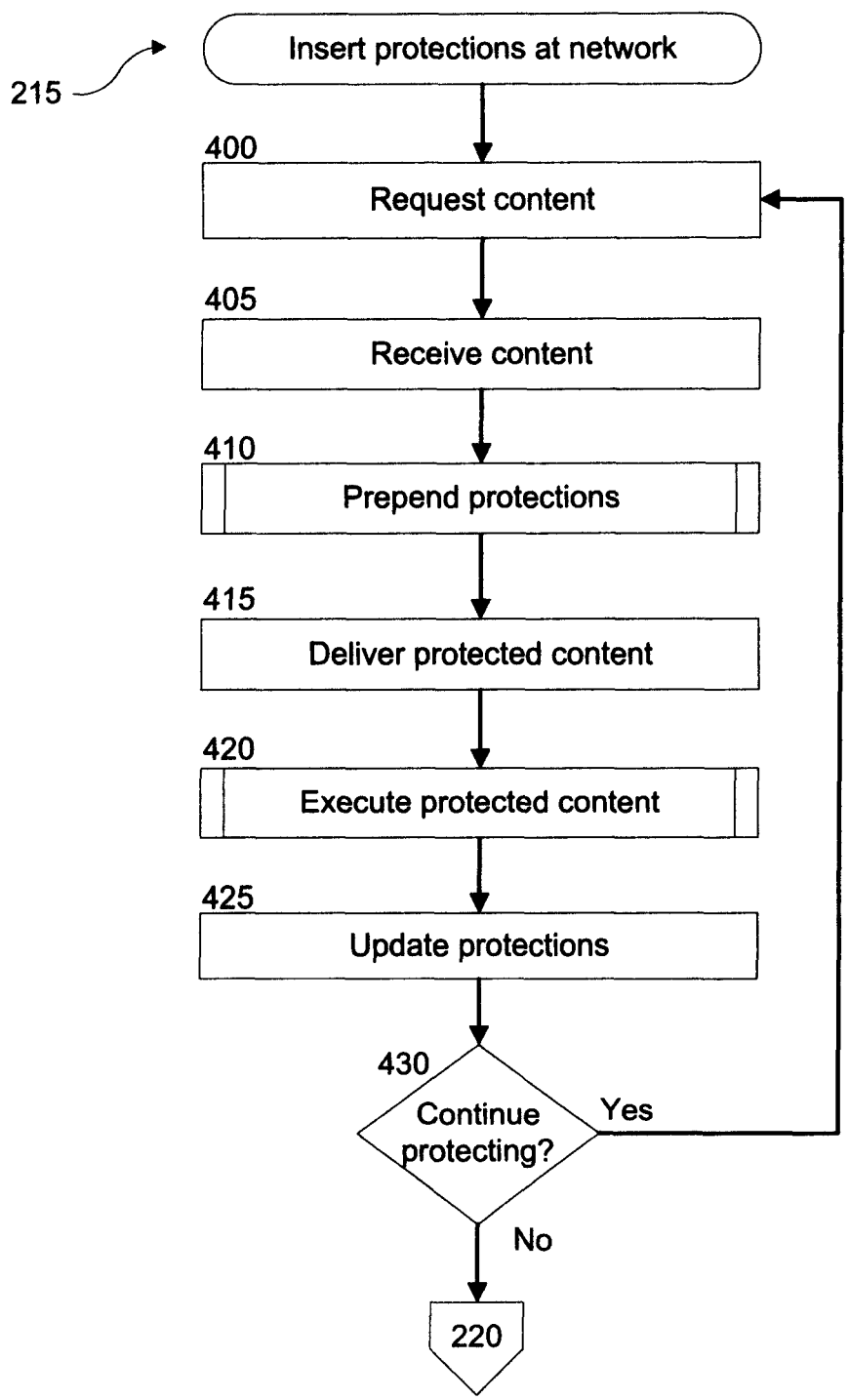
FIG. 4 is a flow chart depicting an exemplary method for inserting protections at a network using the system for run-time attack prevention of FIG. 1.

Referring now to FIG. 4, a method 215 for inserting protections at the network using the system for run-time attack prevention of FIG. 1 is described. FIG. 4 will be discussed with respect to FIGS. 1 and 2. Step 400 is the first step in the method 215, wherein the end user 102 requests content. As discussed above, in an exemplary embodiment, the request originates from an internet browser installed on the end user's 102 computer, although, in alternative embodiments, the request can be any request to a remote server 108 for content that will ultimately execute on the end user's 102 computer. The method 215 then proceeds to step 405, wherein content is received at the network. The method 215 then proceeds to step 410, wherein protections are prepended to the response. In this exemplary embodiment, a protection engine 112 is coupled with a proxy server 104 installed on the network that intercepts responses and adds or prepends protections thereto as described above with respect to FIG. 1. The process of prepending protections will be discussed in further detail with respect to FIG. 5.

The method 215 then proceeds to step 415, wherein the protected content is delivered to the end user 102. In an exemplary embodiment, the protection engine 112 routes the protected content back to the proxy server 104 (or to the location on the network from which it intercepted the response), which routes the responses back to the end user 102. The method 215 then proceeds to step 420, wherein the protected content is executed on the end user's 102 computer. In an exemplary embodiment, the protected content is executed within the end user's 102 internet browser. In alternative exemplary embodiments, however, the protected content can be executed outside of the browser.

The method 215 then proceeds to step 425, wherein the protection engine 112 updates its protections. In an exemplary embodiment, the protection engine 112 receives updated protections from a protection server 114. The method 215 then proceeds to decision step 430, wherein it is determined whether to continue protecting. If it is determined that the system should continue protecting, the "Yes" branch is followed back to step 400. On the other hand, if it is determined not to continue protecting, then the "No" branch is followed and the method 215 returns to step 220 of FIG. 2.

Figure 5:
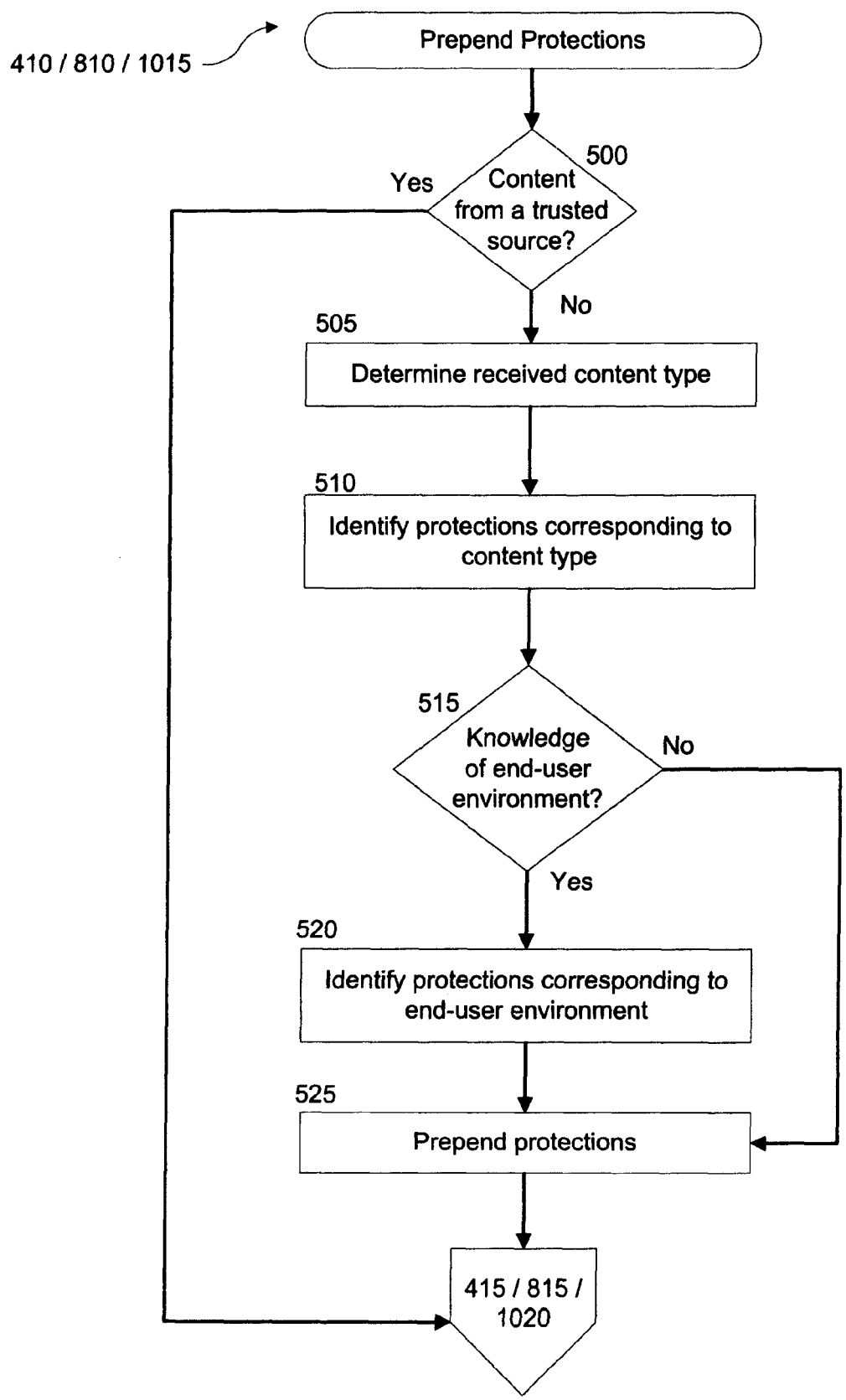
FIG. 5 is a flow chart depicting an exemplary method for prepending protections.

Referring now to FIG. 5, a method 410/810/1015 for prepending protections using the systems for run-time attack prevention of FIGS. 1, 7, and 9 is shown. FIG. 5 will be discussed with respect to FIGS. 1, 4, 8, and 10. Decision step 500 is the first step in the method 410/810/1015, wherein it is determined if the received content is from a trusted source. By way of example only, content may be identified as having been received from a trusted source if the source address of the content was present in a database of known good senders (often referred to as a whitelist). If it is determined that the content was received from a trusted source, in an exemplary embodiment, the "Yes" branch is followed, and the method 410/810/1015 returns to step 415/815/1020. In an alternative exemplary embodiment, the system can be configured to ignore information relating to the source of the content, and can prepend protections regardless of the source.

Turning again to decision step 500, if it is determined that the content is not from a trusted source, then the "No" branch is followed to step 505, wherein the type of received content is determined. By way of example only, it is determined whether the received content contains any executable code that could potentially be employed in an attack, such as JavaScript, Flash, or Silverlight. The method 410/810/1015 then proceeds to step 510, wherein protections are identified that correspond to the content types identified in step 505. In certain instances, particular protections will be applicable only to particular forms of executable content. Accordingly, it can improve performance to identify only those protections that can apply to the content at hand.

The method 410/810/1015 then proceeds to decision step 515, wherein the protection engine 112 determines if it has knowledge of the end-user environment. In an exemplary embodiment, the protection engine 112 obtains information relating to the end-user from the request for the content. Alternatively, the protection engine 112 may store information relating to the configuration of end users 102 on the network that includes end-user environment information. If it is determined that the protection engine 112 does not have knowledge of the end user 102 environment, the "No" branch is followed to step 525, wherein the protections that were identified in step 510 are prepended to the content. The method 410/810/1015 then returns to step 415/815/1020.

Referring again to decision step 515, if it is determined that the protection engine 112 has knowledge of the end user 102 environment, the "Yes" branch is followed to step 520, wherein protections corresponding to the end user 102 environment are identified. For example, if the end user 102 environment includes Google Chrome as the web browser, then protections directed to protecting against an exploit that exists only in Microsoft Internet Explorer Version 6 need not be prepended. In an exemplary embodiment, the protections corresponding to the end user 102 environment are selected from the set of protections corresponding to the content type. In an alternative embodiment, the protections corresponding to the end user 102 environment may be selected separately from the protections corresponding to the content type. The method 410/810/1015 then proceeds to step 525, wherein all identified protections are prepended to the content. The method 410/810/1015 then returns to step 415/815/1020.

Figure 6:
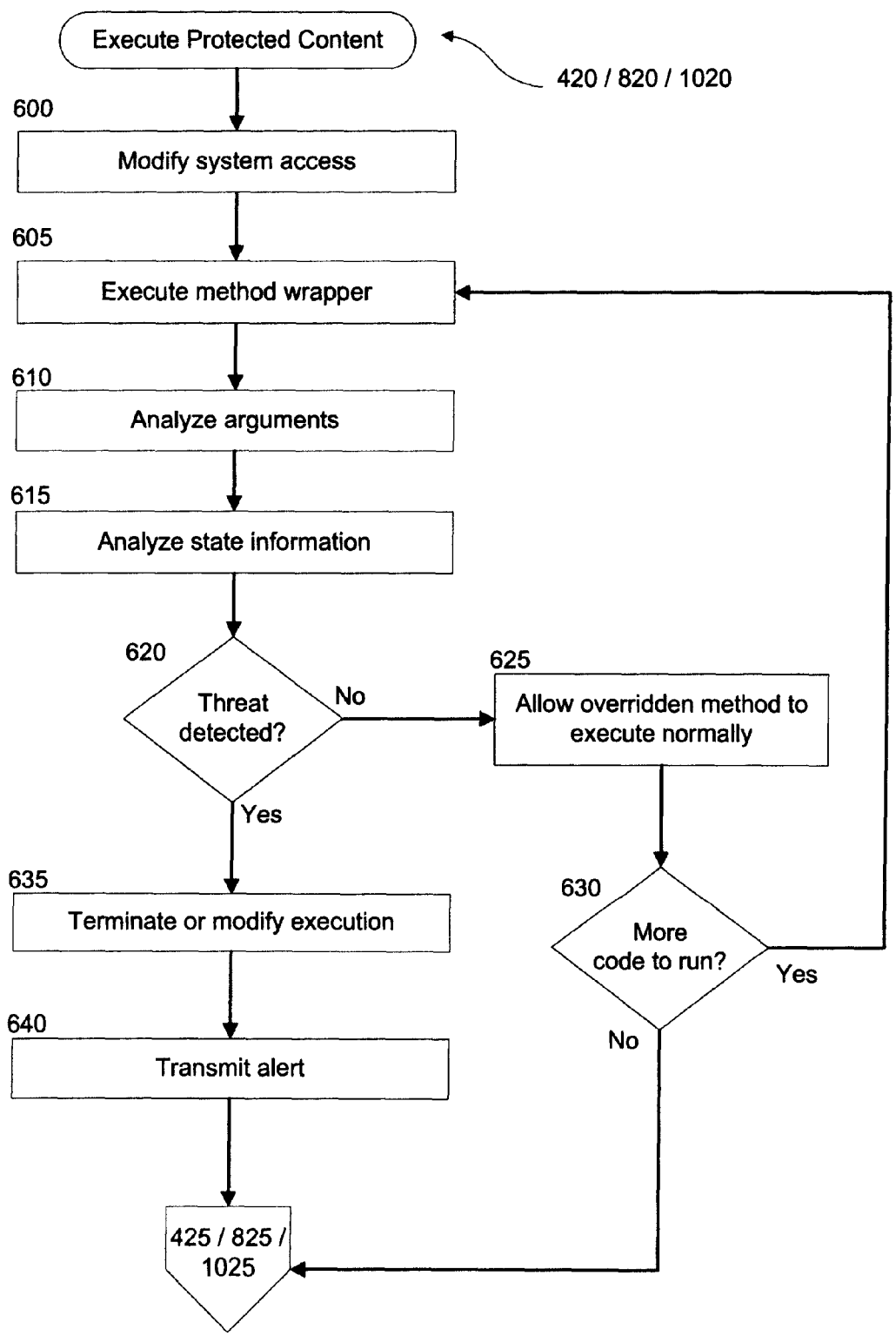
FIG. 6 is a flow chart depicting an exemplary method for executing protected content for run-time attack prevention.

Turning now to FIG. 6, a method 420/820/1020 for executing protected content using the systems for run-time attack prevention of FIGS. 1, 7, and 9 is shown. FIG. 6 will be described with respect to FIGS. 1, 4, 8, and 10. Step 600 is the first step of the method 420/820/1020, wherein the system access afforded to the content is modified. The method 420/820/1020 then proceeds to step 605, wherein the function wrapper is executed. In an exemplary embodiment, the function wrapper is executed when executable code calls a protected function (i.e., a function for which a protection has been created). The method 420/820/1020 then proceeds to step 610, wherein the arguments passed to the protected function are analyzed for attacks. The method 420/820/1020 then proceeds to step 615, wherein state information is analyzed. By way of example only, state information can relate to the number of times a particular protected function has been called within a given browsing session or period of time, the temporal relationship between a call to the protected function and another protected function, or other state-based information that may indicate an attack.

The method 420/820/1020 then proceeds to step 620, wherein it is determined whether the state information or the arguments indicate the existence of a potential threat. If it is determined that a potential threat does not exist, the "No" branch is followed to step 625, wherein the overridden method is permitted to execute normally. The method 420/820/1020 then proceeds to decision step 630, wherein it is determined whether the content contains more code to run. If it is determined that the content contains more code to run, the "Yes" branch is followed and the method 420/820/1020 proceeds to step 605. If, on the other hand, the content contains no more code to run, the "No" branch is followed and the method 420/820/1020 returns to step 425/825/1025.

Referring again to decision step 620, if it is determined that a threat is detected, the "Yes" branch is followed to step 635, in which execution of the content is terminated or modified. In an exemplary embodiment of the present invention, the execution of the content is terminated without executing the protected function. In an alternative exemplary embodiment, the execution of the content can be modified to thwart the attack without terminating execution. The method 420/820/1020 then proceeds to step 640, wherein an alert is transmitted. Various alerts can be transmitted, and the alerts can be transmitted to various recipients. In an exemplary embodiment, the alert is transmitted to the network administrator, who can determine how to respond to the alert. In an alternative exemplary embodiment, the alert is transmitted to the end user 102. In another alternative exemplary embodiment, the alert is transmitted to a third-party. The method 420/820/1020 then returns to step 425/825/1025.

Figure 8:
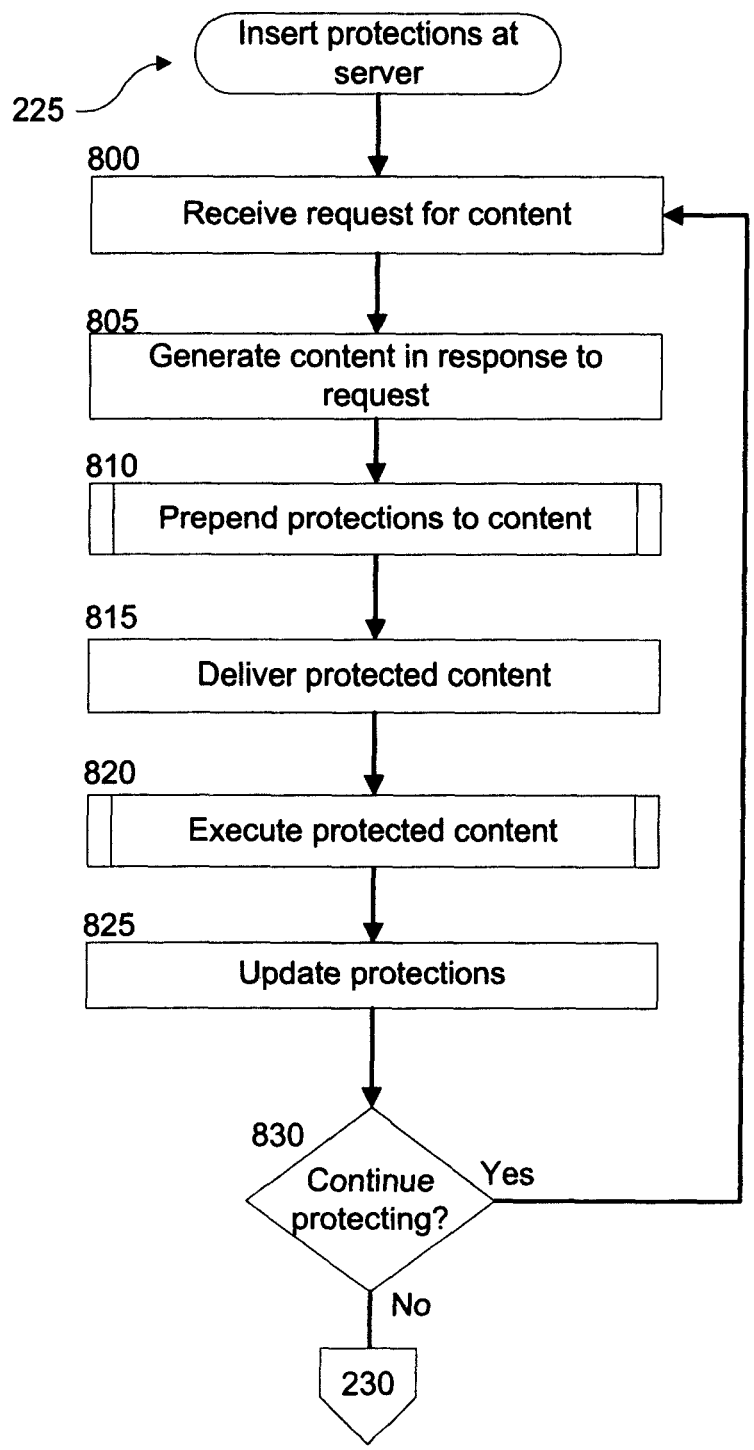
FIG. 8 is a flow chart depicting an exemplary method for inserting protections at a server using the system for run-time attack prevention of FIG. 7.

Turning now to FIG. 8, a flow chart depicting a method 225 for inserting protections at a server using the system 700 for run-time attack prevention of FIG. 7 is shown. FIG. 8 will be discussed with respect to FIG. 7. Step 800 is the first step in the method 225, wherein the remote server 708 receives a request for content. The method 225 then proceeds to step 805, wherein a response to the request is generated. The method 225 then proceeds to step 810, wherein protections are prepended to the response. The process of prepending protections to the response is described above with respect to FIG. 5.

The method 225 then proceeds to step 815, wherein the protected response is delivered over the internet to the end user 702. The method 225 then proceeds to step 820, wherein the protected content is executed. The process of executing protected content is described in further detail with respect to FIG. 6. The method 225 then proceeds to step 825, wherein the protections are updated. The method 225 then proceeds to decision step 830, wherein it is determined whether the system 700 should continue protecting. If it is determined that the system 700 will continue protecting, the "Yes" branch is followed to step 800. On the other hand, if it is determined the system should cease protecting, the "No" branch is followed and the method 225 returns to step 230.

Figure 10:
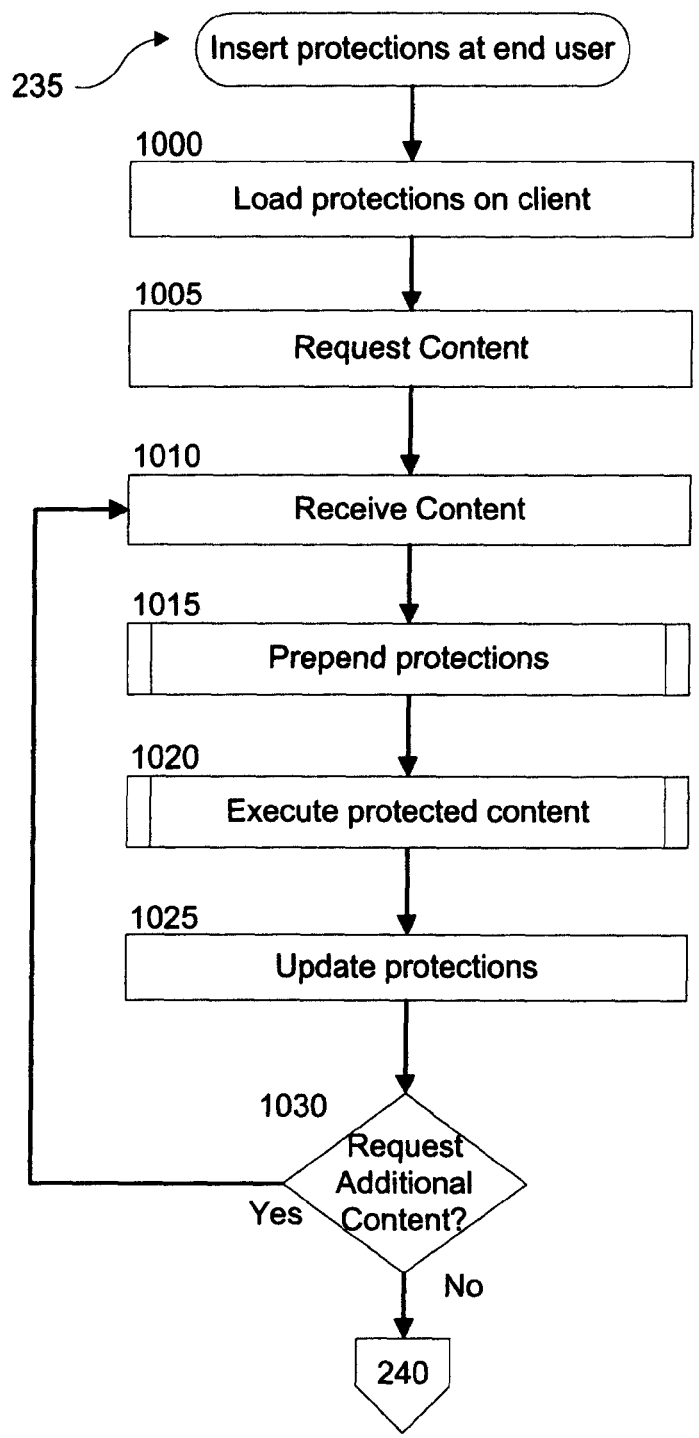
FIG. 10 is a flow chart depicting an exemplary method for inserting protections at an end user's computer using the system for run-time attack prevention of FIG. 9.

Turning now to FIG. 10, a flow chart depicting a method 235 for inserting protections at an end user's 902 computer using the system 900 for run-time attack prevention of FIG. 9 is shown. FIG. 10 will be discussed with respect to FIG. 9. Step 1000 is the first step in the method 235, wherein protections are loaded on the end user's 902 computer. The method 235 then proceeds to step 1005, wherein the end user's 902 computer requests content from a remote server 908. The method 235 then proceeds to step 1010, wherein content is received at the end user's 902 computer. The method 235 then proceeds to step 1015, wherein the end user's 902 computer prepends protections to the content. The method of prepending protections is described in more detail with respect to FIG. 5. The method 235 then proceeds to step 1020, wherein the protected content is executed. The process for executing protected content is described in additional detail with respect to FIG. 6. The method 235 then proceeds to step 1025, wherein upgrades are protected. The method 235 then proceeds to decision step 1030, wherein it is determined whether additional content is requested. If it is determined that additional content is requested, the method 235 follows the "Yes" branch to step 1010. If, on the other hand, it is determined in step 630 that no additional content is requested, the method 235 follows the "No" branch and the method 235 returns to step 240.

Alternative embodiments of the system and method for run-time attack prevention will become apparent to one of ordinary skill in the art to which the present invention pertains without departing from the spirit and scope of this disclosure. Thus, although this invention has been described in exemplary form with a certain degree of particularity, it should be understood that the present disclosure has been made only by way of example and that numerous changes in the details of construction and the combination and arrangement of parts or steps may be resorted to without departing from the spirit or scope of the invention. Accordingly, the scope of the present invention is defined by the appended claims rather than the foregoing description.

What is claimed is:

1. A method for protecting a computer, comprising:
receiving, at a protection device, content destined for a computer, wherein the content is configured to access a function of the computer, and wherein the content is received from a server, and wherein the content comprises a call to the function;
adding, at the protection device, a protection to the content corresponding to the function, wherein the protection is configured to observe the function and wherein adding the protection further comprises:
determining a computing environment associated with the computer;
identifying a first protection corresponding with the computing environment; and
adding the first protection to the content;
transmitting the content and the protection to the computer; and
executing the protection in response to the call to the function, wherein executing the protection comprises determining whether an argument the content passed into the function represent a threat to the computer.

2. The method of claim 1, wherein observing the function comprises overriding the function.

3. The method of claim 1, wherein observing the function comprises analyzing an argument passed into the function.

4. The method of claim 1, wherein the function comprises a function that exposes a vulnerability of the computer.

5. The method of claim 1, wherein an argument passed to the function exploits a vulnerability of the computer.

6. The method of claim 1, further comprising the step of terminating execution of the content without executing the function in response to determining that the argument represents a threat.

7. The method of claim 1, further comprising the step of modifying the content in response to determining that the argument represents a threat.

8. The method of claim 1, further comprising the step of allowing the function to execute normally in response to determining that no threat exists.

9. The method of claim 1, further comprising alerting at least one of an end user, a network administrator, and a third-party of the threat in response to determining that the argument represents a threat.

10. The method of claim 1, wherein the computing environment comprises at least one of the operating system, the internet browser, and the applications installed on the computer.

11. The method of claim 1, further comprising the steps of:
determining a type of the content;
identifying a first protection corresponding with the type; and
adding the first protection to the content.

12. The method of claim 11, wherein the content type comprises executable code for at least one of JavaScript, Flash, and Silverlight.

13. The method of claim 1, wherein the step of adding the protection comprises prepending the protection to the content.

14. A system for protecting a computer, comprising:
a first computer configured to provide content;
a second computer configured to receive the content from the first computer, the content configured to access a function of the second computer;
a protection engine coupled to the first computer, the protection engine configured to intercept the content before the content is received by the second computer, to add a protection to the content, to transmit the protection and the content to the second computer, and to execute the protection in response to a call to the function, wherein executing the protection comprises determining whether an argument the content passed into the function represent a threat to the computer
wherein in adding the protection, the protection engine is further configured to:
determine a computing environment associated with the second computer;
identify a first protection corresponding with the computing environment; and
add the first protection to the content; and
wherein the protection overrides the function such that the protection is executed when the content calls the function when the function represents a threat to the second computer.

15. The system of claim 14, wherein adding the protection to the content comprises prepending the protection to the content.

16. The system of claim 14, wherein the first computer comprises the protection engine.

17. The system of claim 14, wherein the first computer comprises the second computer.

18. The system of claim 14, wherein the protection is configured to modify the content upon determining that the function comprises a threat.

19. The system of claim 14, wherein the protection is configured to terminate the execution of the content upon determining that the function comprises a threat.

20. The system of claim 14, wherein the protection is configured to alert one of an end user, a network administrator, and a third-party upon determining that the function comprises a threat.

21. A method for the run-time prevention of attacks on a computer, the method comprising:
receiving, at a server, a request for executable content from a computer, wherein the executable content is configured to access a function of the computer;
sending, from the server, the content to the computer;
intercepting at a protection device the content;
adding, at the protection device, a protection to the content, wherein the protection overrides the function that is accessible by the executable content, wherein adding the protection further comprises:
determining a computing environment associated with the computer;
identifying a first protection corresponding with the computing environment; and
adding the first protection to the content;
transmitting, from the protection device, the protection and the content to the computer; and
executing the protection in response to a call to the function, wherein executing the protection comprises determining whether an argument the content passed into the function represent a threat to the computer.

22. The method of claim 21, further comprising the step of executing the content and the protection, comprising:
determining, with the protection, if an argument the executable content passes to the function represent a threat to the computer.

23. The method of claim 22, further comprising terminating the execution of the content in response to determining that the argument represent a threat to the computer.

24. The method of claim 22, further comprising modifying the content in response to determining that the argument represents a threat to the computer.

25. The method of claim 22, further comprising alerting at least one of an end user, a network administrator, and a third-party of the threat.

26. The method of claim 21, wherein the content comprises one of JavaScript, Flash, and Silverlight.

27. The method of claim 21, wherein adding the protection comprises prepending the protection.

28. The method of claim 21, wherein the protection is added at the server.

29. A system for protecting a computer, comprising:
a computer exposing at least one function coupled to a network, the computer configured to receive, via the network, content configured to access the function and execute the content upon receipt, the function comprising at least one argument;
a protection system coupled to the network and configured:
to intercept the content before it is received by the computer; and
to prepend a protection to the content, wherein in prepending the protection to the content, the protection system is further configured:
to determine a computing environment associated with the computer;
to identify a first protection corresponding with the computing environment; and
to add the first protection to the content; and
to transmit, from the protection device, the protection and the content to the computer;
wherein the computer is configured to execute the protection in response to a call to the function, wherein executing the protection comprises determining whether the argument represent a threat to the computer;
wherein the protection is configured to be executed by the computer when the content attempts to execute the function,
wherein the protection is further configured to analyze the argument to determine whether the argument comprises a threat to the computer if passed into the function,
wherein the protection is further configured to modify the execution of the content in response to determining that the argument comprises a threat to the computer if passed into the function, and
wherein the protection is further configured to allow the function to execute as called by the content in response to determining that the argument does not comprise a threat to the computer if passed into the function.

30. The system of claim 29, wherein the step of modifying the execution of the content comprises terminating the execution of the content.

31. The system of claim 29, wherein the content comprises at least one of JavaScript, Flash, and Silverlight.

32. The system of claim 29, wherein the content comprises ASCII text that is executed upon receipt.

33. The system of claim 29, wherein the computer further comprises an internet browser configured to execute the content upon receipt, and the function is exposed by the internet browser.

34. The system of claim 29, wherein the protection is further configured to transmit an alert to at least one of an end user, a network administrator, and a third-party in response to determining that that the argument comprises a threat to the computer if passed into the function.

35. A non-transitory computer-readable medium including code for performing a method, the method comprising:
receiving, at a protection device, content destined for a computer, wherein the content is configured to access a function of the computer, and wherein the content is received from a server, and wherein the content comprises a call to the function;
adding, at the protection device, a protection to the content corresponding to the function, wherein the protection is configured to observe the function wherein adding the protection further comprises:
determining a computing environment associated with the computer;
identifying a first protection corresponding with the computing environment; and
adding the first protection to the content;
transmitting the content and the protection to the computer; and
executing the protection in response to the call to the function, wherein executing the protection comprises determining whether an argument the content passed into the function represent a threat to the computer.

36. The computer-readable medium of claim 35, wherein observing the function comprises analyzing an argument passed to the function.

37. The computer-readable medium of claim 1, the method further comprising executing the protection in response to the call to the function, wherein executing the protection comprises determining whether an argument the content passed into the function represent a threat to the computer.

38. The computer-readable medium of claim 37, the method further comprising the step of terminating execution of the content without executing the function in response to determining that the argument represents a threat.

* * * * *